United States Patent [19]

Nolan

[11] 4,040,444

[45] Aug. 9, 1977

[54] AIR-PRECLUDING FLOW REGULATOR

[75] Inventor: John J. Nolan, Cambridge, Mass.

[73] Assignee: Sala Magnetics, Inc., Cambridge, Mass.

[21] Appl. No.: 683,660

[22] Filed: May 6, 1976

[51] Int. Cl.[2] .................... F15D 1/14; F16L 41/00; F17D 1/00

[52] U.S. Cl. .................................. 137/561 A; 137/844; 138/45

[58] Field of Search ............... 137/561 A, 561 R, 218, 137/844, 846, 142, 151; 138/45, 46

[56] References Cited

U.S. PATENT DOCUMENTS

| | | | |
|---|---|---|---|
| 3,423,913 | 1/1969 | Mecklin | 137/561 R |
| 3,463,159 | 8/1969 | Heimlich | 137/846 X |
| 3,759,289 | 9/1973 | De Wall | 137/844 |

*Primary Examiner*—William R. Cline

*Attorney, Agent, or Firm*—Joseph S. Iandiorio

[57] ABSTRACT

An air-precluding flow-regulating device for maintaining a predetermined flow rate through a conduit from a site of higher to a site of lower elevation, comprising: a section of normally collapsed soft resilient tube forming at least a part of the conduit and having a length at least as great as the variation in back pressure expressed in head at the site of lower elevation, said tube being disposed to contain the ambient pressure level within its length.

4 Claims, 6 Drawing Figures

AIR-PRECLUDING FLOW REGULATOR

FIELD OF INVENTION

This invention relates to a one-part air-precluding flow-regulating device, and more particularly to such a device including a normally collapsed, soft, resilient tube.

BACKGROUND OF THE INVENTION

Stream-splitter devices are used to divide a primary flow into a plurality of satellite flows which are supplied to a number of processing devices. Often one of the satellite flows is used to periodically extract samples of the flow for testing and evaluating. Typically the primary reservoir or tank is vertically oriented and satellite flows emerge from identical orifices at the same level to ensure equality among the satellite flows. Each of the satellite flows is directed into a satellite conduit in which the level is beneath the level of the orifice in order that each orifice work into the same pressure, e.g. atmospheric, regardless of any difference in downstream loading, impedance or back pressure. While this approach serves to produce equal flow in each satellite conduit regardless of downstream flow differences, it introduces another problem: it allows air to be entrapped in the flow in the satellite conduit. The entrapped air can cause problems in controlling the pressure and flow in the processing satellite devices and can cause cavitation, turbulences and otherwise interfere with subsequent processing. Recently it has been suggested to use a feedback system employing a number of parts, electrical, mechanical or hydraulic, including a level sensor, pressure sensor or other condition monitor associated with the flow in a satellite conduit to operate a valve associated with the same satellite conduit to maintain the pressure in that satellite conduit at a predetermined level above ambient.

SUMMARY OF INVENTION

It is therefore an object of this invention to provide an improved and extremely simple air-precluding flow-regulating device which uses but one part.

It is a further object of this invention to provide such a device which maintains a particular flow regardless of variations in back pressure and other time-varying conditions.

The invention results from the realization that a normally collapsed, soft, resilient tube, when partially collapsed, maintains on the flow passing through it the same pressure that is exerted on the outside of the tube and that any tendency to reduce the internal pressure, such as due to the siphoning effect of the difference in elevation head between the two ends of the tube, is offset by a further closing of the tube which further restricts the flow and increases the friction to the flow to offset that pressure decrease, and the further realization that such a tube can be used to apply effectively ambient, e.g. atmospheric, pressure on orifice output and to regulate the flow rate to that determined by orifice size and feed elevation head, as well as to preclude introduction of air into the flow.

The invention features an air-precluding flow-regulating device for maintaining a predetermined flow rate through a conduit from a site of higher to a site of lower elevation. The device includes a section of normally collapsed, soft, resilient tube forming at least a part of the conduit and having a length at least as great as the variation in back pressure expressed in head at the site of lower elevation. The tube is disposed to contain the ambient pressure level within its length.

Preferably the end of the tube proximate the lower elevation site is maintained at a pressure at least as great as the ambient pressure. In one embodiment the air-precluding flow-regulating device is adapted for use with each satellite conduit associated with each orifice of a multi-orifice stream splitter system which feeds a number of satellite devices.

DISCLOSURE OF PREFERRED EMBODIMENT

Other objects, features and advantages will occur from the following description of a preferred embodiment and the accompanying drawings, in which.

Figure 1:
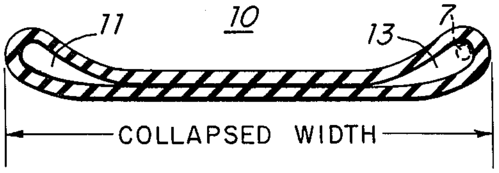
FIG. 1 is a cross-sectional diagram of a normally collapsed soft, resilient tube known as a "Gooch" tube, which may be used in the air-precluding flow-regulator device according to this invention.

An air-precluding flow-regulating device for maintaining a predetermined flow rate through a conduit from a site of higher to a site of lower elevation may be accomplished according to this invention using a section of normally collapsed, soft, resilient tube forming at least a part of the conduit and having a length at least as great as the variation in back pressure expressed in head at the site of lower elevation. In order to use this minimum length, certain conditions have to be satisfied, as discussed below. The tube is disposed to contain the ambient pressure level within its length. The tube may be soft rubber or similar material or may be woven hose or any other suitable material.

One type of normally collapsed, soft, resilient tubing suitable for this invention is the type of tubing known as Gooch tubing. Gooch tubing has been available commercially for many years. It has about the consistency of a bicycle inner tube and is typically made of a yellow gum rubber or black neoprene. It generally serves as a stock from which rubber bands are made, and it comes in a wide range of sizes. Its name derives from the fact that it was offered originally by the Gooch Rubber Company. Previously it has been used as an alternative to a siphon break in overflow lines in order to prevent a vessel from being siphoned below a predetermined level. For example, if it is desirable to partially drain the vessel from its present first level to a second lower level, but not below that second lower level, using an overflow line connected to the vessel at a third still lower level and to direct the overflow liquid to some discharge location below the vessel, a siphon break is inserted in the overflow line at the second level below which the draining is to cease. Without the siphon break, there is a tendency to siphon the vessel beyond the second level; such siphoning tends to continue until the level in the vessel reaches the third level. Instead of a siphon break, a normally collapsed, soft, resilient tube such as a Gooch tube may be applied as the part of the overflow line. The Gooch tube is arranged so that the upper portion of it is at the same height as the lower level at which the draining of the vessel is to stop, i.e. the second level. In this application the Gooch tube acts as a flapper valve, so that when the fluid level tends to decrease below the lower level, a pressure less than one atmosphere is applied to this portion of the Gooch tube, causing it to collapse under the ambient atmospheric pressure.

In this invention, the Gooch tube or similar tube is used not as a flapper valve, but as an air-precluding flow-regulating device for maintaining a predetermined flow rate through a conduit from a site of higher to a site of lower elevation. In this application the ability of a partially collapsed, soft, resilient tube to maintain, on the flow passing through it, the same pressure that is exerted on the outside of the tube is applied to combat any tendency to reduce the internal pressure in the tube such as due to the siphoning effect of the elevation head difference between the ends of the tube, by offsetting such a tendency by a further closing of the tube which further restricts the flow by increasing the friction to flow to counteract the pressure decrease. In this manner the air-precluding flow-regulating device of this invention is used to apply effectively ambient, e.g. atmospheric, pressure on orifice output and to regulate the flow rate to that determined by orifice size and feed elevation head; as well as to preclude introduction of air into the flow. The fluid medium distributed by the flow distributor may be a liquid or heavy gas or vapor.

Figure 2:
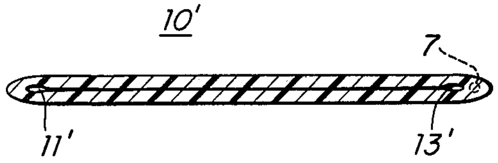
FIG. 2 is a cross-sectional diagram of a normally collapsed, soft, resilient tube similar to the one shown in FIG. 1 but having a slightly different cross-sectional configuration.

A typical normally collapsed, soft, resilient tube such as a Gooch tube 10, is shown in FIG. 1 including small passages 11, 13 at each end which are present in the normally collapsed state of the tube. An alternative 10' is shown in FIG. 2, wherein the passages 11, 13 have been further reduced.

Figure 3:
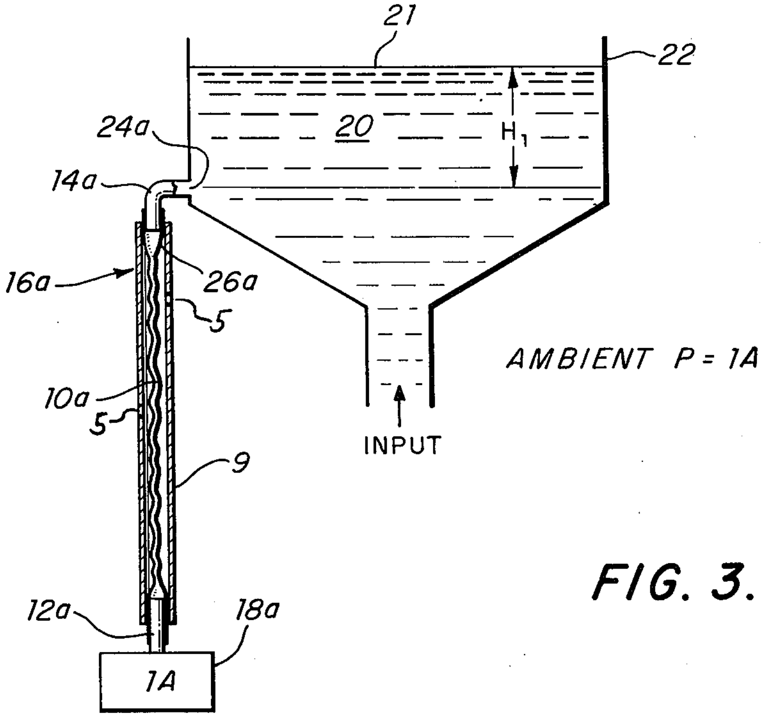
FIG. 3 is a schematic diagram of an air-precluding flow-regulating device according to this invention used in a feeder system.

The use of a normally collapsed, soft, resilient tube or Gooch tube as an air-precluding flow-regulating device according to this invention is illustrated in a simple feed system in FIG. 3, in which tube 10*a* in combination with satellite nipple 12a and orifice outlet 14*a* forms regulating device 16*a*, which delivers to satellite device 18*a* a fluid, e.g. water, 20 through orifice 24*a* from tank 22. In FIGS. 3, 4, 5, and 6, like parts have been given like numbers and similar parts like numbers accompanied by a lower case letter. The ambient pressure in FIG. 3 and the subsequent Figures is considered to be one atmosphere, 14.7 psi, which is the same as the back pressure of one atmosphere (1A), which is present within satellite device 18*a*. Therefore, the normally collapsed tube 10*a* exerts the same internal pressure as is being exerted on its outside walls, namely one atmosphere (1A). Thus the flow rate through conduit 16*a* is determined essentially solely by the size of the orifice 24*a*, and the feed elevation head H of the water 20 in tank 22 measured between the surface 21 and the orifice 24*a*. Since the back pressure of satellite device 18*a* is equal to the ambient pressure, tube 10*a* is nowhere distended or expanded beyond a partially collapsed condition. However, at the upper end 26*a* of the tube 10*a*, there may be a slight local distention caused by the speed of the water entering tube 10*a* from orifice outlet 14*a*. In addition to preventing entry of air, partially collapsed tube 10a also acts to maintain the flow rate at the magnitude set by the size of orifice 24*a* and the feed elevation head $H_1$, since the output of orifice 24*a* sees always the atmospheric pressure exerted by tube 10*a*, because tube 10*a* is in a partially collapsed state and atmosperic pressure is exerted on the flow moving through it.

Figure 4:
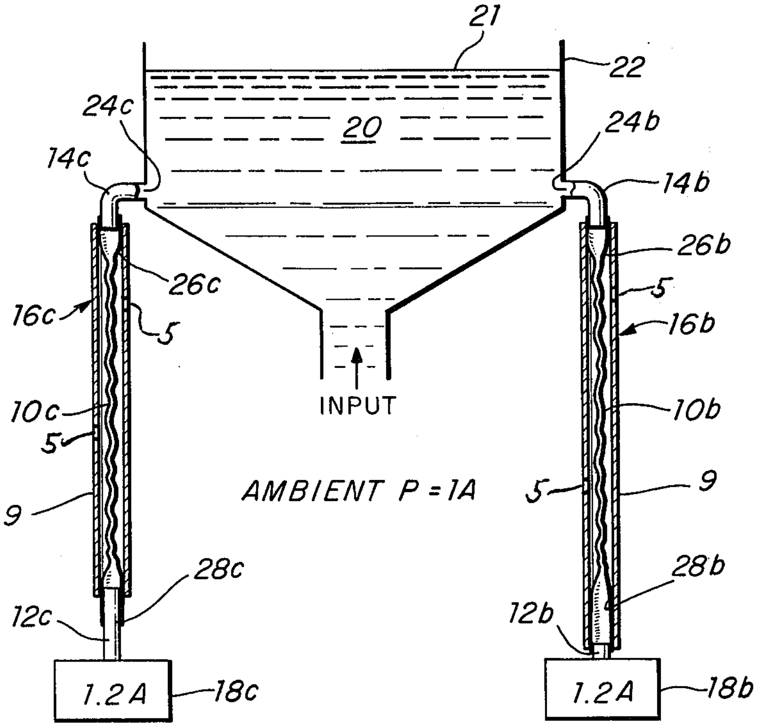
FIG. 4 is a schematic diagram of a pair of air-precluding flow-regulating devices according to this invention used in a stream-splitter system.

When the back pressure in the satellite device exceeds the ambient pressure, such as shown in FIG. 4, which illustrates a stream-splitter system where satellite devices 18*b* and 18*c* have a back pressure of 1.2 atmospheres (1.2A), then the Gooch tube 10*b* will begin to distend at its lower end, and distend upwardly for a distance equal to the increase in back pressure over ambient expressed as head for the particular medium, e.g. water, involved. Thus in FIG. 4 the lower end 28*b* of Gooch tube 10*b* will be distended for a distance of $0.2 \times 34$ feet or 6.8 feet. It is assumed throughout this application that the head for water at atmospheric pressure is 34 feet, neglecting friction losses and other practical considerations. Above that distended portion the tube 10*b* remains in a partially collapsed condition. The distended portion 28*b* may be replaced by a rigid pipe 28*c*, since in fact that 6.8 feet of the distended portion 28*b* of tube 10*b* will never be collapsed if the back pressure remains at 1.2 atmospheres.

If the back pressure in the satellite device drops below the ambient pressure, the lowest portion of the tube, proximate the satellite device, collapses ever more tightly to restrict to an even greater degree the flow through it. Upstream of this constriction the pressure begins to build up and the tube to distend. When the distention reaches a certain level, a volume of water is discharged and the tube begins its constriction mode once again. The cycle continues, often with violent whipping action of the lower end of the tube; however, it is observed that the average flow rate still remains the same as before even though the delivery is pulsating rather than uniform.

In order to prevent undue expansion or ballooning of the tube, a vented rigid pipe 9, having vents 5, FIGS. 3 and 4, may be disposed about the tubes. In addition, to prevent undue stretching or necking of tubes over 24 inches because of their weight plus that of the liquid in them, a wire 7, FIGS. 1 and 2, may be attached to the tube, or the tube may be formed of braided or woven material. The wire 7 may be a flexible type or one which can maintain a predetermined shape. An external reinforcement such as a wire or C clip channel may also be used.

When the back pressure is expected to vary, the length of the tube must be made at least as great as the variation in back pressure expressed in terms of head of the particular liquid involved. The examples presented above (and illustrated in FIG. 3 and FIG. 4) use neither the minimum conduit length nor the minimum tube length. In the stream splitter of FIG. 5, it is assumed that the satellite devices can be positioned relative to the tank to allow the use of minimum lengths. Thus in the stream splitter in FIG. 5, where satellite device 18*d* is indicated as having a back pressure which varies from one to three atmospheres (1-3A) representing a variation in back pressure of two atmospheres, the length of tube 10*d* must be equal to twice the elevation head for water for one atmosphere: $2 \times 34 = 68$ feet. Thus when the pressure in satellite device 18*d* increases from one to two atmospheres, tube 10*d* will begin distending at its lower end at nipple 12*d*, and the distention will continue until it reaches the two-atmosphere point (2A). This is a definition of the two-atmosphere point. The pressure here is one atmosphere when pressure in 18*d* is between 1 and 2 atmospheres, and increases from 1 to 2 as pressure in 18*d* increases from 2 to 3. Continued increase of the back pressure to three atmospheres will cause the distention to continue to move upward until it reaches the three-atmosphere point (3A) at the top of tube 10*b*. The arrangement is such that the total distance from the satellite device 18*d* to orifice 24*d* must be equal to the difference expressed in elevation head between the ambient pressure and the maximum expected back pressure: with respect to satellite device 18*d* that difference is two atmospheres, and thus the total length of conduit 16*d* must be 2 × 34 or 68 feet at the minimum. Since the variation of back pressure is the same amount, i.e. two atmospheres, the length of the Gooch tube 10*d* must be at least 68 feet in length. It can be greater, and in fact a 6 to 12-inch margin to allow for dissipation of velocity head in the distended portion 26*d* is desirable.

The minimum length of tube and minimum length of conduit are not always equal. For example, with respect to satellite device 18*e*, in which the back pressure varies from two to four atmospheres (2 - 4 A), it is seen that the maximum expected back pressure, four atmospheres, is three atmospheres greater than ambient atmospheric pressure, so that conduit 16*e* must be at least 3 × 34 or 102 feet; whereas the variation in back pressure is only two atmospheres so that tube 10*e* need only be a minimum of 2 × 34 or 68 feet. Since the back pressure in satellite device 18*e* will never drop below two atmospheres (2A), the first 34 feet may be constituted by a rigid pipe or the continually distended tube in the area 28*e*. The three-atmosphere point (3A) is halfway up tube 10*e*, while the four-atmosphere point (4A) is at the top of tube 10*e* just below distention 26*e*. As the back pressure increases from two atmospheres to four atmospheres the distention moves from the two-atmosphere point (2A) upwardly in tube 10*e* through the three-atmosphere point (3A) to the four-atmosphere point (4A). For satellite device 18*f* the maximum back pressure is three atmospheres, and the minimum back pressure is two atmospheres so that the difference in back pressure is one atmosphere and the total length of the conduit 16*f* need be only 2 × 34 or 68 feet and tube 10*e* need only be used in the upper 34 feet of conduit 16*f* between the two-atmosphere (2A) point and the three-atmosphere (3A) point between which the variation in pressure is expected.

Since each of the satellite devices 18*a–f* is fed through a sufficient length of tube 10*a–f*, which maintains the liquid in it at atmospheric pressure, the orifices 24*a–f* operate into the same atmospheric pressure at the same feed elevation head, and thus produce the same flow rate to each of the satellite devices 18*a–f*, even though their back pressures are different and may vary, and even though they are at different distances from the orifices. Thus for example, with an elevation head of $H_1$ equal to one foot working through an orifice of area $A_0$ equal to one inch$^2$ into atmospheric pressure the flow rate to each satellite device is about 25 gpm and the Gooch tube has a collapsed width of two inches. The size of the Gooch tube is chosen so that in the distended state it can carry the flow with a frictional pressure drop, expressed as (dimensionless) head loss per unit length, much less than unity, say 0.1 or less. The flow rate for other values of $H_1$ and $A_0$ scales proportionally to $A_0$ and to the square root of $H_1$.

Figure 5:
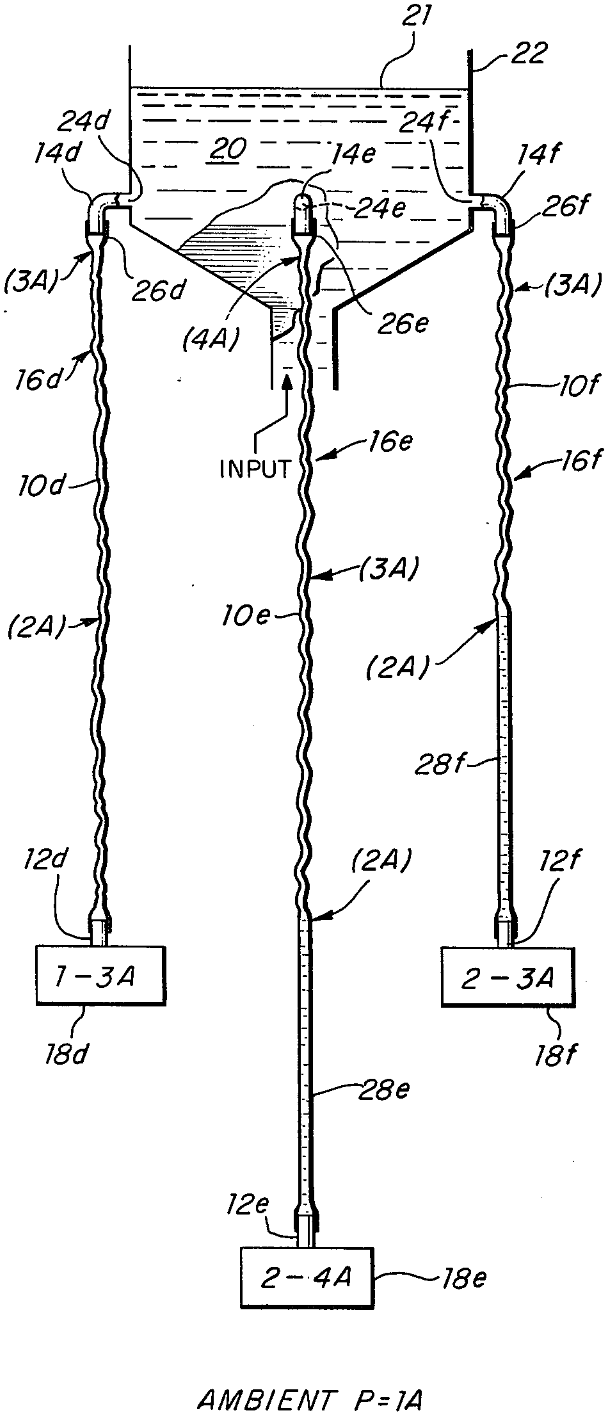
FIG. 5 is a schematic diagram of three air-precluding flow-regulating devices having varying back pressure loads according to this invention used in a stream splitter system.
Figure 6:
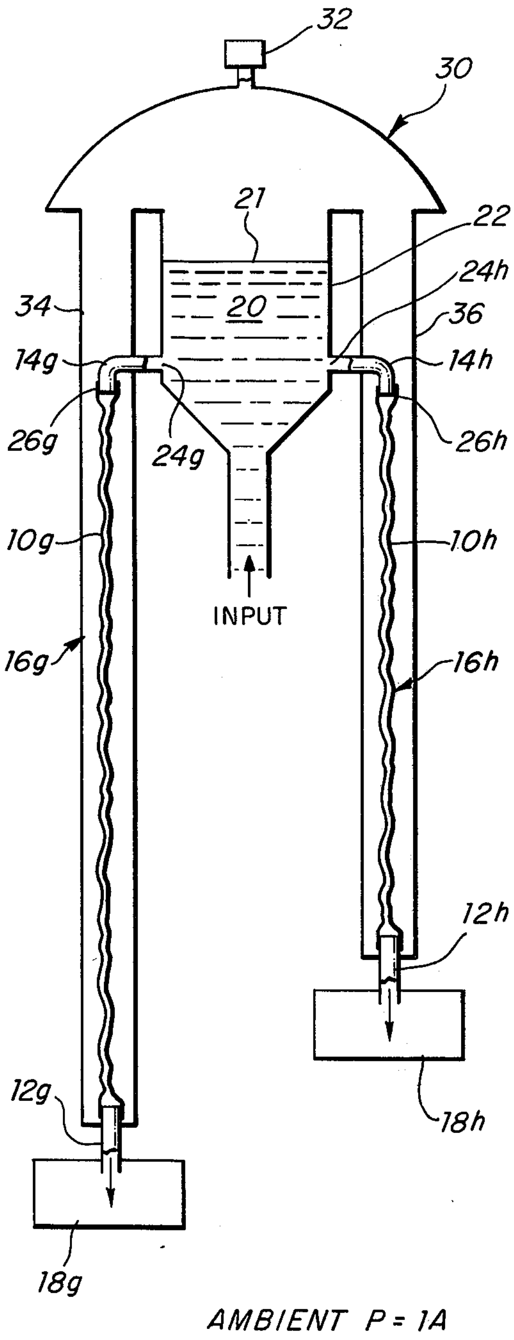
FIG. 6 is a closed system stream splitter using two air-precluding flow regulators according to the invention.

Although thus far in FIGS. 3, 4, and 5 the simple feeder and the stream-splitter systems have been operating in an environment where the ambient pressure is one atmosphere, this is not a necessary limitation of the invention. For example, there is shown in FIG. 6 a pressure jacket 30 surrounding and in part integral with tank 22. Jacket 30 includes a pressure control 32 which can either increase or decrease the pressure within jacket 30 relative to the pressure of one atmosphere outside the jacket. Jacket 30 includes two sleeves 34 and 36 which surround and enclose satellite tubes 16*g* and 16*h* respectively. If each of the satellite devices 18*g* and 18*h* has a minimum back pressure at all times of three atmospheres, then the pressure within jacket 30 may be increased to three atmospheres, and the length of conduit 16*g* and 16*h* decreased accordingly.

Contrastingly, if it is desired to further reduce air entrapment in the water 20, with satellite devices 18*g* and 18*h* operating at a back pressure of one atmosphere, jacket 30 may have the pressure in it reduced, for example to one-half atmosphere, in which case the minimum conduit length is the equivalent of one-half atmosphere expressed in head, or 17 feet, in order to maintain the proper pressure. With the pressure in jacket 30 reduced below one atmosphere, air previously entrained in the liquid will have an increased tendency to leave the liquid at, the surface 21 of the liquid 20.

Although the invention has been generally illustrated with tube lengths in the tens of feet, this is not a limitation of the invention. This was done for ease of explanation with respect to the pressure variables. Lengths in the order of feet and inches are used.

Other embodiments will occur to those skilled in the art and are within the following claims:

What is claimed is:

1. An air-precluding flow-regulating device, included in each satellite conduit associated with each orifice located at a higher elevation of a multi-orifice stream-splitter system which feeds a number of satellite devices at lower elevations, whose back pressure is subject to variatons between predetermined lower and upper limits, comprising: a section of normally collapsed, soft, resilient tube forming at least a part of the conduit sealingly connected with its respective said orifice and its respective said satellite, and having a length at least as long as the variation between said lower and upper limits of back pressure at the satellite device expressed in head, said tube being disposed to contain the ambient pressure level within its length.

2. The air-precluding flow-regulating device of claim 1 in which the end of said tube proximate said lower elevation satellite device is maintained at a pressure at least as great as the ambient pressure.

3. An air-precluding flow-regulating device for maintaining a predetermined flow rate through a conduit from an orifice at higher elevation to a device at lower elevation, whose back pressure is subject to variations between predetermined lower and upper limits, comprising: a section of normally collapsed soft, resilient tube forming at least a part of the conduit, sealingly connected with its respective said orifice and its respective said device, and having a length at least as long as the variation between said lower and upper limits of back pressure at the satellite device expressed in head, said tube being disposed to contain the ambient pressure level within its length.

4. The air-precluding flow-regulating device of claim 3 in which the end of said tube proximate said lower elevation site is maintained at a pressure at least as great as the ambient pressure.

* * * * *